May 22, 1956  M. VUILLEUMIER  2,746,239
TIMEPIECE BEARING
Filed Sept. 29, 1953  5 Sheets-Sheet 4

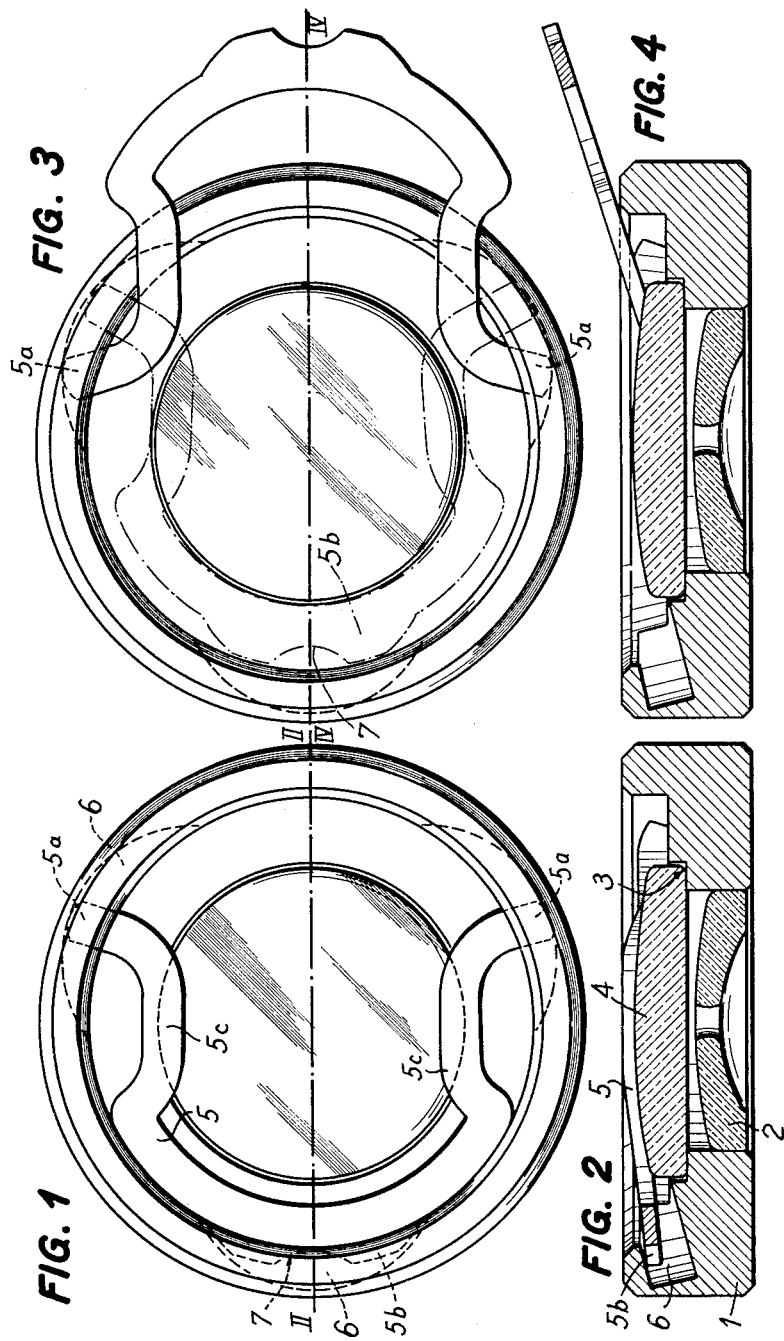

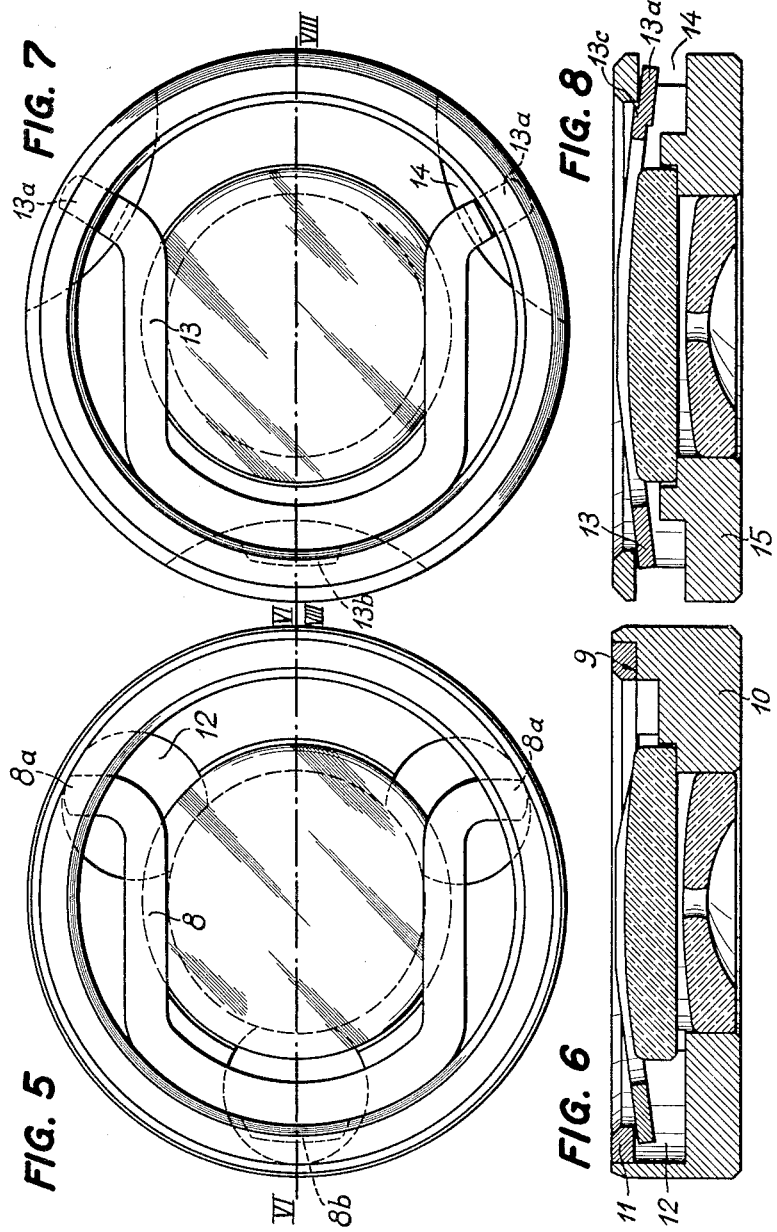

United States Patent Office 2,746,239
Patented May 22, 1956

2,746,239

TIMEPIECE BEARING

Marcel Vuilleumier, Pully, Switzerland, assignor of one-half to Parechoc S. A., Le Sentier, Switzerland, a corporation of Switzerland Application September 29, 1953, Serial No. 383,043

Claims priority, application Switzerland October 2, 1952

9 Claims. (Cl. 58—140)

The present invention has for its object a timepiece bearing in which the endstone is held in place by a blade spring resting on the one hand on the bearing body or support and on the other hand on the endstone.

According to an important feature of my invention, said blade spring is U-shaped and is clamped to the support by the extremities of its arms extending outwardly and by its medial portion, this blade spring being mounted on the support in such a way that its medial portion can be released, which allows the blade spring to be turned around the extremities of its arms acting as pivots, whereby the endstone becomes free for its assembling or dismantling.

Accompanying drawings show, by way of example, several embodiments of the object of the invention, Fig. 1 is a plan view of the first embodiment.

Fig. 2 is a sectional view along line II—II of Fig. 1.

Fig. 3 is a plan view of the same bearing for another position of the blade spring.

Fig. 4 is a sectional view along line IV—IV of Fig. 3.

Fig. 5 is a plan view of another embodiment.

Fig. 6 is a sectional view along line VI—VI of Fig. 5.

Fig. 7 is a plan view of another embodiment.

Fig. 8 is a sectional view along line VIII—VIII of Fig. 7.

Figure 9:
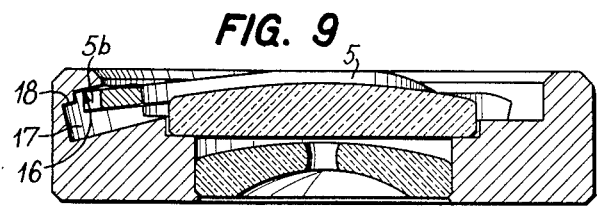
Fig. 9 is a sectional view, similar to that of Fig. 2, of a modification.

The rigid bearing illustrated in Figs. 1 to 4 comprises a support 1 in which is mounted a throughstone or perforated jewel 2 while a circular seat 3 of the support carries the endstone 4. This latter is held in place by a U-shaped blade spring 5 the outwardly bent extremities 5a of the arms of which are clamped in arcuate recesses 6 provided in the support 1; the medial portion of the blade spring shows an outwardly extending boss 5b which is similarly clamped inside a recess 6 of the support. The medial sections 5c of the arms rest over the endstone 4.

A notch 7 is provided in the boss 5b. This notch allows the introduction of a tool by means of which the blade spring may be pushed to the right hand side of Figs. 1 and 3. During this displacement, the two arms 5a, the ends of which engage the bottom of the recesses 6, are elastically bound. When the boss 5b is released, the blade spring 5 can be lifted and be rocked into the position of Figs. 3 and 4 round the extremities 5a of the arms, which act as pivots.

In the embodiment of Figs. 5 and 6, the blade spring 8 has, as precedingly, the shape of a U the extremities of the arms of which are bent outwardly at 8a and the medial portion of which includes an outer projection 8b. An annular groove 9 is provided in the support 10 of the bearing; a ring 11 is located in this groove. Three recesses 12, arranged at 120° from one another are formed in the wall of the support 10 defined by the annular groove 9 so that the ends 8a and the projection 8b on the blade spring 8 may extend inside said recesses and be covered by the ring 11 engaging the groove 9.

In the embodiment of Figs. 7 and 8, the blade spring 13 is clamped, by the bent extremities 13a of its arms and by an outer projection 13b on its medial portion, in recesses 14 extending through the wall of the body 15. The extremities 13a of the blade spring 13 are slightly offset rearwardly with respect to the body of the blade spring 13 so as to form shoulders 13c acting as abutments which prevent the spring 13 from moving in an undesired manner towards the right hand side of Figs. 7 and 8.

The modification of Fig. 9 distinguishes from the embodiment of Figs. 1 to 4 through the provision, on the upper surface 16 of the three recesses 17 engaged by the extremities 5a and by the projection 5b on the blade spring 5 of a shoulder 18 preventing any undesired shifting of the blade spring.

Figure 10:
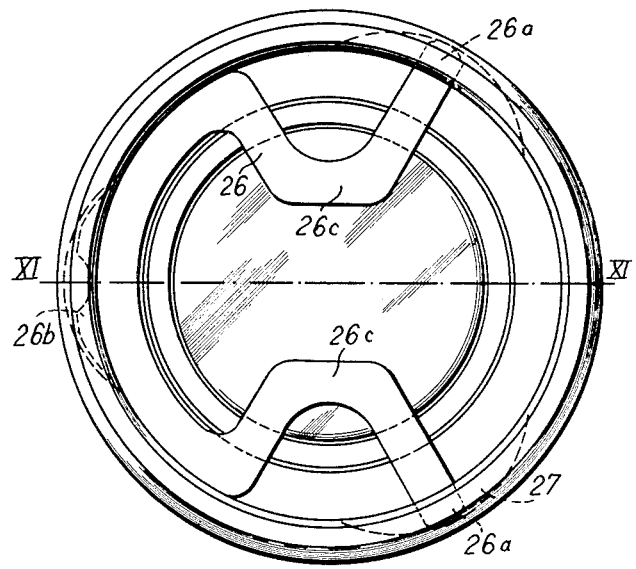
Fig. 10 is a plan view of another embodiment.
Figure 11:
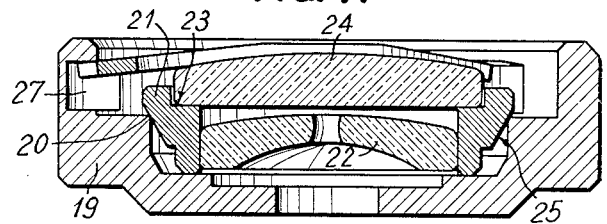
Fig. 11 is a sectional view along line XI—XI of Fig. 10.

The preceding embodiments relate to fixed bearings; the embodiment of Figs. 10 and 11 relate to a shock-absorbing bearing in which the spring blade functions as a return spring. In this bearing the support is designated by 19. It shows a seat 20 for a bezel 21 of the through-stone or hole-jewel 22. This bezel shows a seat 23 for the endstone 24. The outer face 25 of the bezel, bearing on the seat 20, is frusto-conical. The bezel, the hole-jewel and the endstone are urged back, after the displacement due to the shocks acting on the endstone, by a U-shaped blade spring 26 the extremities 26a of the arms of which are bent outwardly and the medial portion of which shows an outer projection 26b. These extremities 26a and this projection 26b are held fast in recesses 27 provided in the support 19, while the arms are bent inwardly at 26 so as to rest on the endstone 24.

Figure 12:
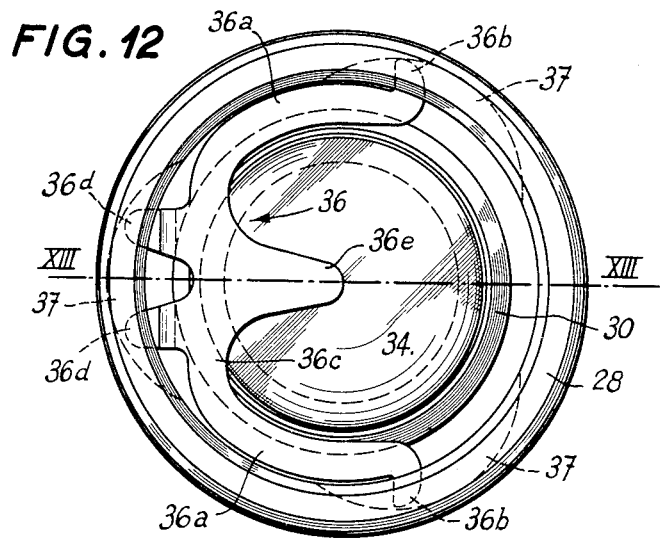
Fig. 12 is a plan view of another embodiment.
Figure 13:
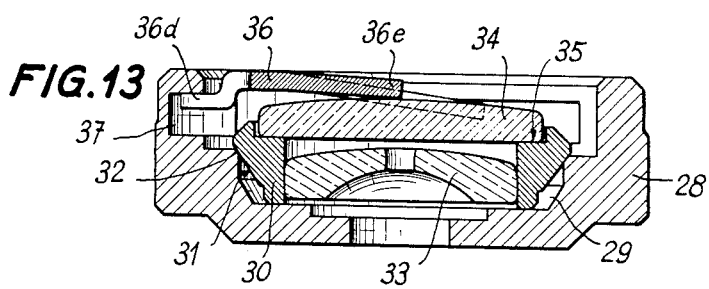
Fig. 13 is a sectional view along line XIII—XIII of Fig. 12.

The bearing shown in Figs. 12 and 13 comprises a support 28 intended to be mounted in the base plate of a clockwork and which shows a central recess 29 in which is located a bezel 30 showing an outer frustoconical surface 31 resting in a seat 32 of the support 28. The hole-jewel 33 is set in the bezel 30, while the endstone 34 rests in a seat 35 of this bezel. The endstone 34 is held by a U-shaped blade spring 36 the extremities 36b of the arms 36a of which are bent outwardly and enter arcuate recesses 37 provided in the support 28. The medial portion 36c of the spring 36 shows two outer projections 36d entering a third recess 37 of the support 28. This medial portion shows also an inner projection 36e the inner end of which rests on the center of the endstone 34.

For the dismantling of the bearing, a tool can be introduced between the two projections 36d whereby the blade spring can be pushed to the right hand side of Fig. 12 until the projections 36d are disengaged from the recess 37 in which they are housed. Then the spring 36 can be lifted and rocked around the extremities 36b of its arms which act as pivots. The blade spring 36 holds the endstone in position and at the same time forms a return spring absorbing the shocks applied to the balance staff.

Figure 14:
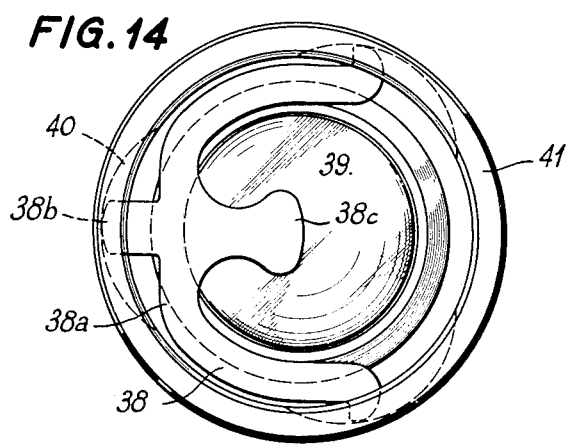
Figs. 14, 15 and 16 are plan views respectively of three other bearings for time-pieces.

Fig. 14 shows also a shock absorbing bearing which distinguishes from that of Figs. 12 and 13 by the feature that the medial portion 38a of the securing blade spring 38 of the endstone 39 is provided with only one outer projection entering a recess 40 of the support 41. The inner projection 38c of the blade spring 38 resting on the center of the endstone 39, distinguishes by its shape from the inner projection 36e of the embodiment of Figs. 12 and 13.

Figure 15:
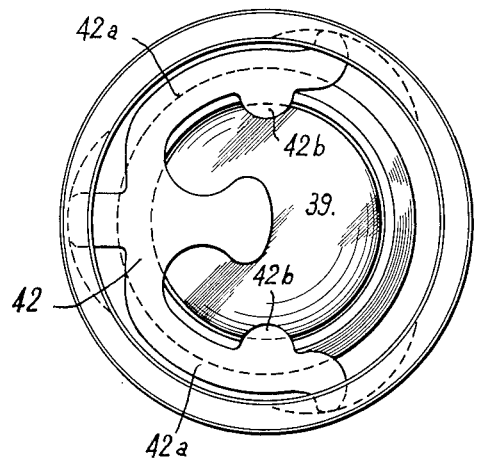

In the embodiment of Fig. 15, the blade spring 42 of the endstone 39 is identical with the blade spring 38 of the embodiment of Fig. 14 except for the fact that its arms 42a show each an inner projection 42b resting on the endstone 39. This arrangement is particularly suitable for fixed bearings, the blade spring 42 being insufficiently resilient for shock absorbing bearings.

Figure 16:
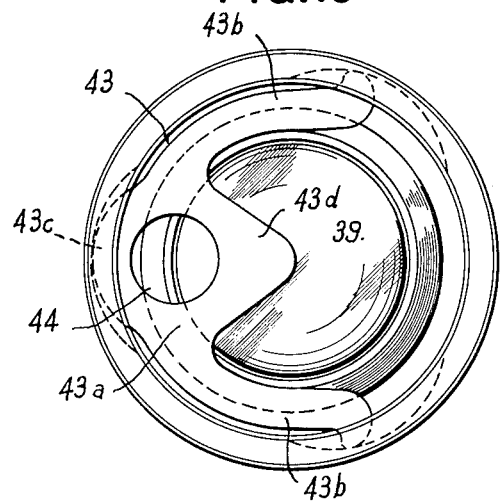

In the embodiment of Fig. 16, which shows a shock-absorbing bearing, the medial portion 43a of the blade spring 43 of the endstone 39 has the shape of an arc of a circle and the same is the case for its arms 43b. This medial portion has also an arcuate projection 43c and an inner projection 43d which has the shape of a triangle and rests on the center of the endstone 39. A hole 44 provided in the blade spring between the projections 43c and 43d allows the introduction of a tool for the dismantling of the blade spring 43.

What I claim is:

1. A bearing for a time-piece comprising an annular support with a stepped section and with three arcuate recesses formed in the inner wall of the support to the front of the stepped section and of which two are arranged symmetrically with reference to the diameter passing through the third recess, a throughstone held in the support to the rear of the recessed section, an endstone held inside the stepped section of the support over said throughstone, a generally U-shaped blade spring engaging the outer front surface of the endstone and including a medial section, an outwardly directed projection on the latter adapted to be held inside the third recess in the support and to slide inside said recess in the direction of the above-mentioned diameter, said U-shaped blade spring having two lateral sections rigid with the medial section and an outwardly directed terminal section at the outer end of each lateral section adapted to be held in the corresponding recess to one side of the diameter passing through the third recess and to slide inside said recess to a slight extent longitudinally of said diameter to allow a shifting of said blade spring along said diameter to release the said projection from its cooperating recess, and thereafter permitting a pivoting movement of the blade spring round the axis defined by the terminal sections.

2. A bearing for a time-piece, comprising an annular support with a stepped section and with three arcuate recesses formed in the inner wall of the support to the front of the stepped section and of which two are arranged symmetrically with reference to the diameter passing through the third recess, a throughstone held in the support to the rear of the recessed section, an endstone held inside the stepped section of the support over said throughstone, a generally U-shaped blade spring including a medial section, an outwardly directed projection of the latter adapted to be held inside the third recess in the support and to slide inside said recess in the direction of the above-mentioned diameter, said U-shaped blade spring having two lateral sections rigid with the medial section and engaging the outer surface of the endstone, an outwardly directed terminal section at the outer end of each lateral section adapted to be held in the corresponding recess to one side of the diameter passing through the third recess and to slide inside said recess to a slight extent longitudinally of said diameter to allow a shifting of said blade spring along said diameter to release said projection from its cooperating recess, and thereafter permitting a pivoting movement of the blade spring round the axis defined by the two last mentioned terminal sections.

3. A bearing for a time-piece, comprising an annular support with a stepped section and three arcuate recesses formed in the inner wall of the support to the front of the stepped section and of which two are arranged symmetrically with reference to the diameter passing through the third recess, a throughstone held in the support to the rear of the recessed section, an endstone held inside the stepped section of the support over said throughstone, a generally U-shaped blade spring including a medial section, an outwardly directed projection of the latter adapted to be held inside the third recess in the support and to slide inside said recess in the direction of the above-mentioned diameter, an inwardly extending projection rigid with said medial section and engaging the outer surface of the endstone, said U-shaped blade spring having two lateral sections rigid with the medial section and an outwardly directed terminal section at the outer end of each medial section adapted to be held in the corresponding recess to one side of the diameter passing through the third recess and to slide inside said recess to a slight extent longitudinally of last mentioned diameter to allow a shifting of said blade spring along said diameter to release the first mentioned projection from its cooperating recess, and thereafter permitting a pivoting movement of the blade spring round the axis defined by the two last mentioned projections.

4. A bearing for a time-piece, comprising an annular support provided with three arcuate recesses formed in the inner wall thereof and distributed at 120° from one another, said support being further provided with an annular step facing outwardly, a throughstone fitted in the support inwardly of the step, an endstone carried inside the step in the support over said throughstone, a generally U-shaped blade spring including a medial section, at least one outwardly directed projection rigid with the latter and adapted to be held in one of the recesses in the support and to slide to a slight extent therein in a direction passing along the diameter extending axially of said recess, said U-shaped blade spring having two lateral sections rigid with the medial section and engaging the outer surface of the endstone to hold same in position and an outwardly directed terminal section at the outer end of each lateral section, adapted to be held respectively in one of the two other recesses in the support and to slide to a slight extent inside same to allow the blade spring to be slightly shifted in parallelism with the said diameter until the said projection is released with reference to the first mentioned recess and to assume then a pivoting movement round said terminal sections held in the corresponding recesses.

5. A bearing for a time-piece, comprising an annular support provided with an annular step facing outwardly, with a second step of a larger diameter on the outside of the first step and with recesses distributed at 120° from one another in the wall forming said second step, a throughstone fitted in the support inwardly of the steps, an endstone carried inside the first step in the support over said throughstone, a ring fitted in the outer step and extending over the recesses therein, a generally U-shaped blade spring including a medial section, at least one outwardly directed projection rigid with the latter and adapted to be held in one of the recesses in the support and to slide to a slight extent therein in a direction passing along the diameter extending axially of said recess, said U-shaped blade spring having two lateral sections rigid with the medial section and engaging the outer surface of the endstone to hold same in position and an outwardly directed terminal section at the outer end of each lateral section, adapted to be held respectively in one of the two other recesses in the support and to slide to a slight extent inside same to allow the blade spring to be slightly shifted in parallelism with the said diameter until the said projection is released with reference to the first mentioned recess and to assume then a pivoting movement round said terminal sections held in the corresponding recesses.

6. A bearing for a time-piece, comprising an annular support provided with three arcuate recesses formed in and extending through the inner wall thereof and distributed at 120° from one another, said support being further provided with an annular step facing outwardly, a throughstone fitted in the support inwardly of the step, an endstone carried inside the step in the support over said throughstone, a generally U-shaped blade spring including a medial section, at least one outwardly directed projection rigid with the latter and adapted to be held in one of the recesses in the support and to slide to a slight extent therein in a direction passing along the diameter extending axially of said recess, said U-shaped blade spring having two lateral sections rigid with the medial section and engaging the outer surface of the endstone to hold same in position and an outwardly directed terminal section at the outer end of each lateral section, offset inwardly with reference to the support and adapted to be held respectively in one of the two other recesses in the support and to slide to a slight extent inside same up to abutment of the lateral sections against the inner wall of the support to allow the blade spring to be slightly shifted in parallelism with the said diameter until the said projection is released with reference to the first mentioned recess and to assume then a pivoting movement round said terminal sections held in the corresponding recesses.

7. A bearing for a time-piece, comprising an annular support provided with three arcuate recesses formed in the inner wall thereof and the upper surface of which is stepped, the said recesses being distributed at 120° from one another, said support being provided further with an annular step facing outwardly, a throughstone fitted in the support inwardly of its step, an endstone carried inside the step in the support over said throughstone, a generally U-shaped blade spring including a medial section, at least one outwardly directed projection rigid with the latter and adapted to be held in contact with the outer step of one of the recesses in the support and to slide to a slight extent therein in a direction passing along the diameter extending axially of said recess, said U-shaped blade spring having two lateral sections rigid with the medial section and engaging the outer surface of the endstone to hold same in position and an outwardly directed terminal section at the outer end of each lateral section, adapted to be held respectively in contact with the outer step of one of the two other recesses in the support and to slide to a slight extent inside same to allow the blade spring to be slightly shifted in parallelism with the said diameter until the said projection is released with reference to the first mentioned recess and to assume then a pivoting movement round said terminal sections held in the corresponding recesses.

8. A bearing for a time-piece, comprising an annular support including a bezel and a body outwardly surrounding and carrying said bezel, said body being provided with three arcuate recesses formed in the inner wall thereof and distributed at 120° from one another and the bezel in said support being provided with an annular step facing outwardly, a throughstone fitted in the bezel inwardly of the step, an endstone carried inside the step in the bezel over said throughstone, a generally U-shaped blade spring including a medial section, at least one outwardly directed projection rigid with the latter and adapted to be held in one of the recesses in the support and to slide to a slight extent therein in a direction passing along the diameter extending axially of said recess, said U-shaped blade spring having two lateral sections rigid with the medial section and engaging the outer surface of the endstone to hold same in position and an outwardly directed terminal section at the outer end of each lateral section, adapted to be held respectively in one of the two other recesses in the support and to slide to a slight extent inside same to allow the blade spring to be slightly shifted in parallelism with the first mentioned diameter until the said projection is released with reference to the said recess and to assume then a pivoting movement round said terminal sections held in the corresponding recesses.

9. A bearing for a time-piece, comprising an annular support provided with three arcuate recesses formed in the inner wall thereof and distributed at 120° from one another, said support being further provided with an annular step facing outwardly, a throughstone fitted in the support inwardly of the step, an endstone carried inside the step in the support over said throughstone, a generally U-shaped blade spring including a perforated medial section, an outwardly directed projection rigid with the latter and adapted to be held in one of the recesses in the support and to slide to a slight extent therein in a direction passing along the diameter extending axially of said recess, an inner projection rigid with the medial section and engaging the outer surface of the endstone to hold the latter in position, the perforation in the medial section serving as means operable for shifting the blade spring in last mentioned direction, said U-shaped blade spring having two lateral sections rigid with the medial section and an outwardly directed terminal section at the outer end of each lateral section, adapted to be held respectively in one of the two other recesses in the support and to slide to a slight extent inside same to allow the blade spring to be slightly shifted in parallelism with the said diameter until the first mentioned projection is released with reference to the first mentioned recess and to assume then a pivoting movement round said terminal sections held in the corresponding recesses.

References Cited in the file of this patent

FOREIGN PATENTS 260,358     Switzerland             July 16, 1949